United States Patent [19]
Grobe et al.

[11] Patent Number: 5,920,415
[45] Date of Patent: Jul. 6, 1999

[54] TRANSMISSION OF OPTICAL SIGNALS

[75] Inventors: Rainer Grobe, Normal, Ill.; Joseph H. Eberly, Rochester, N.Y.

[73] Assignee: The University of Rochester, Rochester, N.Y.

[21] Appl. No.: 08/743,239

[22] Filed: Nov. 5, 1996

Related U.S. Application Data

[60] Provisional application No. 60/007,421, Nov. 21, 1995.

[51] Int. Cl.⁶ .................................................. H04B 10/12
[52] U.S. Cl. ......................... 359/173; 359/188; 359/195
[58] Field of Search .................................. 359/154, 161, 359/173, 188, 180, 189, 195

[56] References Cited

U.S. PATENT DOCUMENTS

| | | | |
|---|---|---|---|
| 3,644,845 | 2/1972 | Harris | 331/175 |
| 3,679,288 | 7/1972 | Harris | 350/149 |
| 3,795,819 | 3/1974 | Harris | 307/88.3 |
| 3,801,797 | 4/1974 | Harris et al. | 307/88.3 |
| 3,914,618 | 10/1975 | Harris | 307/88.3 |
| 4,000,420 | 12/1976 | Harris | 250/281 |
| 4,218,628 | 8/1980 | Harris | 307/426 |
| 4,380,072 | 4/1983 | Harris | 372/5 |
| 4,802,183 | 1/1989 | Harris et al. | 372/57 |
| 4,870,653 | 9/1989 | Sher et al. | 372/76 |
| 4,918,747 | 4/1990 | Bekooij | 359/168 |
| 5,107,358 | 4/1992 | Hodgkinson et al. | 359/124 |
| 5,251,053 | 10/1993 | Heidmann | 359/145 |
| 5,267,072 | 11/1993 | Maleki | 359/158 |
| 5,309,473 | 5/1994 | Lee | 372/99 |
| 5,363,386 | 11/1994 | Smith | 372/6 |
| 5,379,309 | 1/1995 | Logan, Jr. | 372/18 |
| 5,675,428 | 10/1997 | Henmi | 359/161 |
| 5,710,651 | 1/1998 | Logan, Jr. | 359/145 |

OTHER PUBLICATIONS

R. Grobe, F. T. Hioe, and J. H. Eberly, "Formation of Shape–Preserving Pulses in a Nonlinear Adiabatically Integrable System", The American Physical Society, Physical Review Letters, vol. 73, No. 24, Dec. 12, 1994, pp. 3183–3186, New York.

A. Kasapi, M Jain, G. Yin, and S. Harris, "Electromagnetically Induced Transparency: Propagation Dynamics", Physical Review Letters, vol. 74, No. 13, Mar. 27, 1995, pp. 2447–2450.

*Primary Examiner*—Leslie Pascal
*Attorney, Agent, or Firm*—Nixon, Hargrave, Devans & Doyle LLP

[57] ABSTRACT

A system, method and apparatus for transmission of optical signal in which two laser beams, operating at different frequencies, travel nearly loss-free and shape-invariant within an absorbing medium whereby the nonlinearity of the beams cause an adiabatic interaction of their optical pulses to maintain signals that modulate one of the beams. The adiabatic interaction of the two beams results in shape-preserving pulses called adiabaton pairs to form within the beams within the absorbing medium.

23 Claims, 4 Drawing Sheets

TRANSMISSION OF OPTICAL SIGNALS

This application claims the priority benefit of co-pending provisional application, Ser. No. 60/007,421 filed Nov. 21, 1995.

FIELD OF THE INVENTION

The present invention relates to improvements in transmission of optical signals.

BACKGROUND OF THE INVENTION

The transmission of optical signals for data communication conventionally involves encoding the signals onto a carrier beam at a transmitter, injecting the beam through a low-loss transmission medium, and decoding the signals from the beam at a receiver. The carrier beam is composed of a series of optical waves or pulses. The beam easily propagates through the transmission medium because the medium is optimized for low-loss (i.e., low scatter and absorption), low dispersion and zero near-resonance loss at the wavelength the beam is generated. The most common example of such medium is optical fiber cables used by the telecommunication industry in long distance transmission systems. Such long distance transmission systems typically use these optical fibers with LEDs or laser diodes to generate carrier beams at infra-red wavelengths.

A significant drawback of these conventional optical signal transmission systems is that they cannot efficiently transmit optical signals through non-optimized transmission media due to high signal loss from absorption in the media. Such non-optimized transmission media may be smoke filled air, or atmospheric conditions, like fog. These types of media are generally considered impractical for existing optical transmission systems.

Another drawback of these conventional transmission systems is that they are limited to optical signals in a relatively small set of frequencies, since the transmission media are optimized to be highly non-absorbing in the particular range of infra-red wavelengths available from low-cost laser diodes.

SUMMARY OF THE INVENTION

Accordingly, an object of the present invention is to provide an improved system, method and apparatus for nearly loss-free transmission of shape-invariant optical signals through a transmission medium having characteristics which, in prior art optical signal transmission systems, would cause excessive optical signal loss due to absorption.

A further object of the present invention is to provide an improved system, method, and apparatus for transmission of optical signals using two beams which mutually protect each other through a medium that absorbs light in the frequency bands of at least one of the beams. Each beam operates at different frequencies such that the difference between their frequencies allows optical signals modulating one of the beams to be preserved or maintained while traveling through the medium.

Another object of the present invention is to provide an improved system, method, and apparatus for transmission of optical signals which utilize the properties of inter-coupled soliton light waves for optical signal communication.

Briefly described, a system for transmitting optical signals through a transmission medium is provided, including a transmitter and a receiver, which are each coupled to the transmission medium. The transmitter includes a first laser which generates a first beam (guardian beam) having optical signal pulses at a first frequency, and a second laser which generates a second beam (signal beam) having optical signal pulses at a second frequency different from the first frequency. The second beam is modulated in the transmitter with signals corresponding to an input message, and the difference between the first frequency and the second frequency is selected in accordance with characteristics of the transmission medium for adiabatic interaction of the optical signal pulses in the first and second beams. This adiabatic interaction maintains the signals corresponding to the input message when the first and second beams travel within the transmission medium. The interaction of the two beams forms shape-preserving pulses, called adiabaton pairs, for each modulation signal in the second beam. The transmitter injects the first and second beams into the transmission medium. The receiver receives the first and second beams from the transmission medium, and the signals (adiabaton pairs) corresponding to the input message therein. After the beams are received, the signals corresponding to the input message may be filtered from one of the first and second beams to retrieve the input message.

Further in accordance with the above system the transmission medium is absorbent to at least the second of the laser beams, and the first beam is injected by the transmitter into the transmission medium prior to the second beam.

BRIEF DESCRIPTION OF THE DRAWINGS

The present invention will be better understood and appreciated more fully from the following detailed description, taken in conjunction with the accompanying drawings, in which:

FIGS. 2(a–d) graphically illustrate the adiabatic interaction of the guardian and signal beams within the transmission medium, showing beam temporal profiles at successive penetration distances in the medium denoted by the order of the figures.

DETAILED DESCRIPTION OF THE INVENTION

Figure 1:
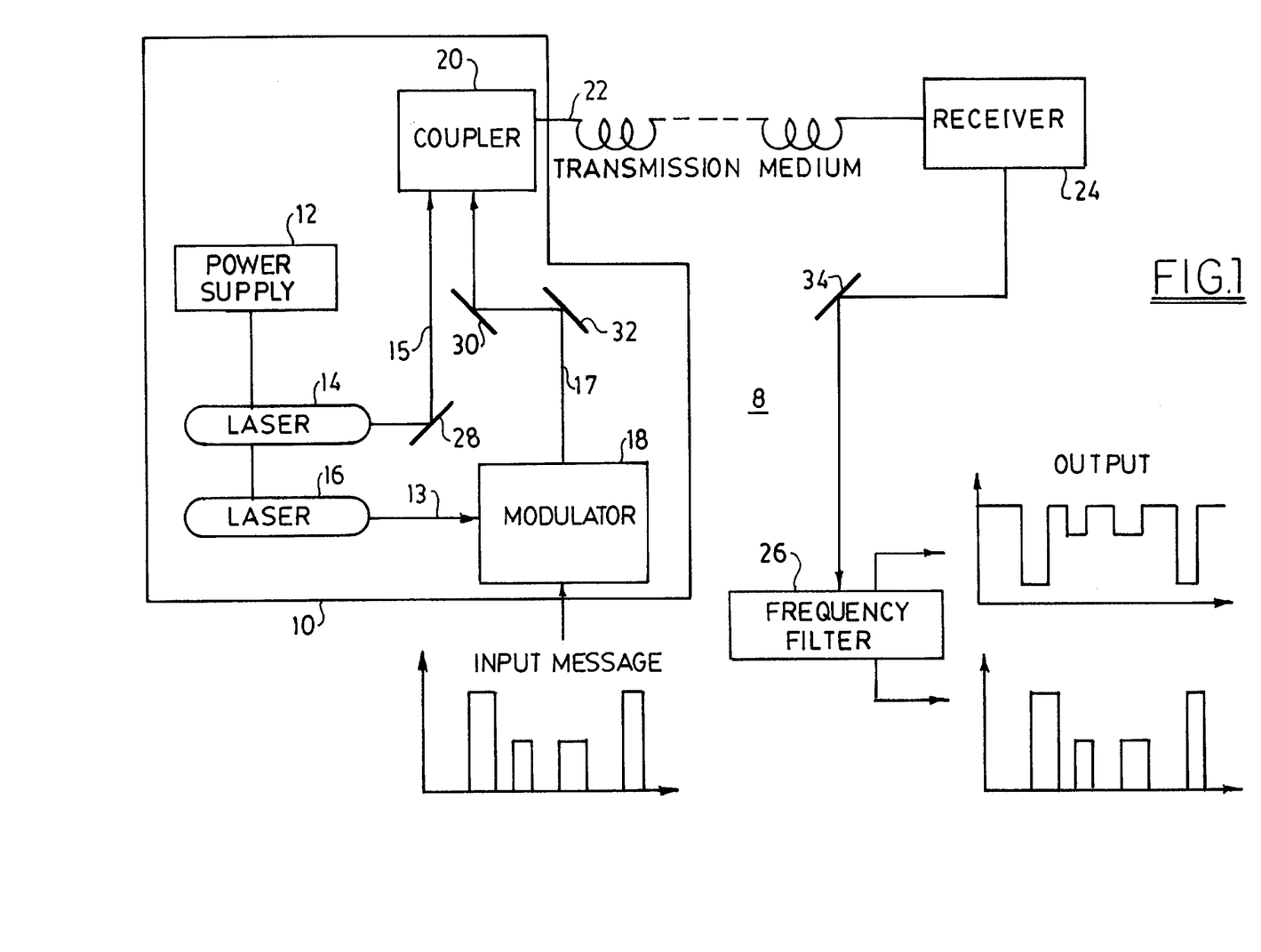
FIG. 1 illustrates the system in accordance with the present invention.

Referring to FIG. 1, the system of the present invention is shown. System 8 has a transmitter 10 and a receiver 24, which are each coupled to opposite ends of a transmission medium 22. Transmitter 10 has two lasers 14 and 16, a power supply 12 coupled to both lasers 14 and 16 to supply operational power, a modulator 18 and coupler 20. Laser 14 produces a beam 15 of optical signal pulses at a first fixed carrier frequency. Beam 15 from laser 14 is reflected by deflector 28 to coupler 20. Beam 15 produced by laser 14 has either a steady non-time varying frequency and amplitude, or a slowly time-varying frequency and amplitude, and is hereinafter referred to as the guardian beam. A second laser 16 produces a beam 13 of optical signal pulses at a second fixed carrier frequency, which is different from the first frequency of laser 14, to modulator 18. Modulator 18 modulates beam 13 from laser 16 with an input message, and produces a beam 17 modulated with message pulses, i.e., the optical signals corresponding to the input message, at the second carrier frequency to coupler 20 via deflectors (mirrors) 30 and 32. The input message is a signal which represents data to be transmitted. An example of an input message is graphically illustrated in FIG. 1. Beam 17 produced by modulator 18 is hereinafter referred to as the signal beam. Coupler 20 combines the guardian beam 15 and signal beam 17, and injects them into transmission medium 22. Coupler 20 is an optical coupler, such as an optical fiber link.

Modulator 18 may be any type of modulator which varies the amount of light or signal strength of a beam in correspondence with the input message. For example, modulator 18 may operate by either the acousto-optic (Brouillin scattering) effect or by an electro-optic (Kerr-type or Pockels-type) effect. If laser 16 is a diode laser, modulation may be directly performed by controlling the current though laser 16 (not shown in FIG. 1). The modulation by modulator 18 may be either analog or digital, but for purposes of illustration, a hybrid analog-digital modulation is shown in FIG. 1, i.e., digital pulse amplitude is varied. Receiver 24 receives the combined guardian 15 and signal 17 beams from transmission medium 22 and sends the combined beams to frequency filter 26 via deflector 34. Deflector 34 and deflectors 28, 30, and 32 represent optical mirrors which are properly oriented to reflect beam light on a particular path. In one embodiment, receiver 24 and frequency filter 26 are separate components, and in another embodiment frequency filter 26 is integrated as a component of receiver 24. Frequency filter 26 filters the message pulses from both the guardian 15 and signal 17 beams, which were preserved within both beams in adiabaton pairs (to be described later), to retrieve the input message. An example of the output from frequency filter 26 is illustrated in FIG. 1, where the top illustration shows the message pulses filtered from guardian beam 15, and the lower illustration shows the message pulses filtered from signal beam 17. Message pulses may be filtered from one or both beams to retrieve the input message. Frequency filter 26 may be any device with wavelength dispersing power, such as a glass prism. Filtering will be described later in connection with FIG. 3.

Lasers 14 and 16 in transmitter 10 are light sources, such as diode lasers, which generate a train of optical pulses at set optical frequencies, the above mentioned first and second frequencies. The frequencies of lasers 14 and 16 are selected such that their difference in frequency is chosen in accordance with the particular transmission medium 22, as will be described later. There is a broad range of frequency bands lasers 14 and 16 may operate within because system 8 depends on frequency difference, rather than being limited only to frequencies corresponding to a band of infrared wavelengths. In one embodiment of system 10, one of the lasers operates at a fixed frequency, while the other laser is tunable to select a desired carrier frequency difference between the guardian 15 and signal 17 beams.

System 8 further requires that the pulses in the guardian 15 and signal 17 beams are properly timed when injected by coupler 20 into transmission medium 22, as also described later. To achieve this, power from supply 12 to laser 14 and laser 16 is separately controllable to turn laser 14 and laser 16 on in a predefined timing pattern. This may also be achieved by a controlled mechanical means, such as shutters, in the path of beams 15 and 17 (not shown in FIG. 1).

Medium 22 is characterized by a resonance structure which facilitates the mutual protection of the guardian 15 and signal 17 beams at their frequency difference. Medium 22 is absorbent to at least signal beam 17, and may also be separately absorbent to guardian beam 15. The material for transmission medium 22 has electric dipole radiation attributes, as described later in Equations (2) and (4). Such material may be a type of glass adapted into a fiber cable, as illustrated in FIG. 1, or other types of materials with significant absorption to beams 15 and 17, such as smoke filled air or atmospheric conditions, like fog. However, medium 22 is not limited to these examples. Note that system 8 contrasts with conventional prior art optical signal transmission systems, since such prior art systems are based on using transmission media which are optimized to be highly non-absorbing to a carrier beam.

The present invention is based on our discovery that the envelops of the pulses in the guardian 15 and signal 17 beams adjust and change shape to preserve the message pulses, thereby allowing the message pulses to travel or propagate shape-invariant and nearly loss-free (without absorption) in transmissive medium 22. The application of this discovery in system 8 involves non-linear wave theory. The details underlying the discovery are discussed below.

Usually the balance between nonlinearity and dispersion in nonlinear wave equations is so critical for their solutions that only a limited set of mathematical solution functions is suitable, and these are usually restricted to combinations of hyperbolic secants. In system 8, the need for this critical balance is greatly reduced. The following discussion derives a pair of nonlinear wave equations representing the guardian 15 and signal 17 beams that have the unusual property that, as a coupled pair, they provide a shape-preserving character.

Below are generic equations for the energy field of the signal 17 and guardian 15 beams which interact with medium 22 in which they propagate. The signal 17 and guardian 15 beam field amplitudes are denoted $V_a$ and $V_b$, respectively, which depend on laboratory coordinates z and t, and the medium response is determined by two nonlinear functions $f(V_a)$ and $h(V_b)$. In terms of pulse-localized coordinates $\zeta=z$ and $\tau=t-z/c$, the wave operator $\partial/\partial z+\partial/\partial ct$ becomes simply $\partial/\partial \zeta$ and thus $V_a$ and $V_b$ are expressed by:

$$\partial V_a/\partial \zeta = i g f(V_a), \tag{1a}$$

$$\partial V_b/\partial \zeta = i g h(V_b). \tag{1b}$$

Many examples of such nonlinear wave equations are known (e.g., sine-Gordon, Korteweg-de Vries, and nonlinear Schrödinger). In almost all if not all such cases in physics, the nonlinear functions f and h are determined by a deeper dynamical interaction that is truncated at the lowest order of nonlinearity, usually cubic. However, in this invention a physical example is found in which this deeper interaction is not truncated, in which exact integrability is nevertheless achieved, and for which the prediction of an arbitrary solution function shape is testable by optical experiments.

This dynamical interaction is described as follows. A trivial example occurs when $f(V_a)$ and $h(V_b)$ are obtained from linear equations such as $i\partial/\partial \zeta = -gV_a$. The effect is purely dispersive of course and causes only a velocity change. However, this example becomes nonlinear if the coupling "constant" g defined by Equations (1a) and (1b)

also becomes a dynamical variable that is itself coupled to f and h and the V's, i.e., $V_a$ and $V_b$. Such a situation actually arises naturally in quantum optics where the V's can be interpreted as proportional to the electric field strengths of a pair of laser beams traversing the same medium, and g enters very symmetrically with f and h through the equation:

$$i\frac{\partial}{\partial \tau}\begin{bmatrix}f\\g\\h\end{bmatrix} = -\begin{bmatrix}0 & V_a & 0\\V_a & i\gamma & V_b\\0 & V_b & 0\end{bmatrix}\begin{bmatrix}f\\g\\h\end{bmatrix} \quad (2)$$

$\psi = [f, g, h]$ defines the atomic state vector of the three-level atoms comprising medium 22. Equation (2) is the appropriate Schrödinger equation, where $\gamma$ in the equation defines the irreversible relaxation rate. The initial state vector at $\psi(\zeta, \tau = -\infty) = [1, 0, 0]$. Because of this boundary conditionsf, h, $V_a$, $V_b$ are all real and g is pure imaginary throughout. Basically, Equation (2) describes how the dipoles of the atoms of transmission medium 22 change as $V_a$ and $V_b$ travels through. The coupled Equations (1) and (2) are solved without dynamical truncation, i.e., without introducing an approximate nonlinear susceptibility and without relaxation to a steady state, as described below.

First, note the results if only one wave is present, for instance $V_a$ but the dynamical coupling to g is retained. For example, when the single pulse under consideration is slowly changing and weak ($V_a << \gamma$), the overdamped solution for g is given by $ig \approx (V_a/\gamma)f$. When this is substituted into Equation (1a), $\partial V_a/\partial \zeta \approx -(1/\gamma)f^2 V_a$ is obtained. If the pulse is not too long, f can change only negligibly, and generic exponential-type spatial decay of the pulse as it propagates is represented mathematically as: $V_a(\zeta,\tau) \approx V_a(0,\tau) \exp[-\zeta/\gamma]$.

Under the opposite assumption (strong pulse: $\gamma << V_a$) a soliton solution is obtained. Deriving soliton solutions is described in A. C. Scott, F. V. F. Chu, and D. W. McLaughlin, Proc. IEEE 61, 1443 (1973); and G. L. Lamb Jr., "Elements of Soliton Theory", Wiley (1980). In this case, by neglecting $\gamma$ and introducing the (integrated-pulse-amplitude variable $$\Phi_a(\zeta,\tau) \equiv 2\int_{-\infty}^{\tau} d\tau' V_a(\zeta,\tau'),$$

the sine-Gordon equation of self-induced transparency is obtained: $\partial^2 \phi_a/\partial \zeta \partial \tau = \sin \Phi_a$, with its familiar $2\pi$-sech solution. It follows from Equations (1) and (2) that the signal beam 17 pulse "energy"

$$E_a(\zeta) \equiv \int_{-\infty}^{\infty} d\tau' V_a^2(\zeta,\tau')$$

satisfies the equation $\partial E_a/\partial \zeta = f^2(\zeta,\tau=\infty)-1$. The presence of the decay parameter $\gamma$ in Equation (2) mandates that $f(\zeta,\tau=\infty)\to 0$ if the pulse is strong or long enough. Then the pulse energy decreases linearly, not exponentially, with a characteristic decay length $Z_a$, which can be defined in terms of the pulse energy at $\zeta=0$, viz., $Z_a \equiv E_a(0)$. Although the existence of $Z_a$ depends on the presence of relaxation rate $\gamma$, the value of $Z_a$ does not.

In the dynamically coupled two-pulse situation of the guardian 15 and signal 17 beams, Equations (1) and (2) have to be solved consistently as a boundary and initial value problem which, in general, requires a numerical approach. However, analytic solutions under certain conditions may be obtained. Because an adiabatic assumption is key to the solutions, the term "adiabaton" is used to describe these pulses. Adiabatic herein refers to the way the pulses of the guardian 15 and signal 17 beams turn on and off.

Figure 2A:
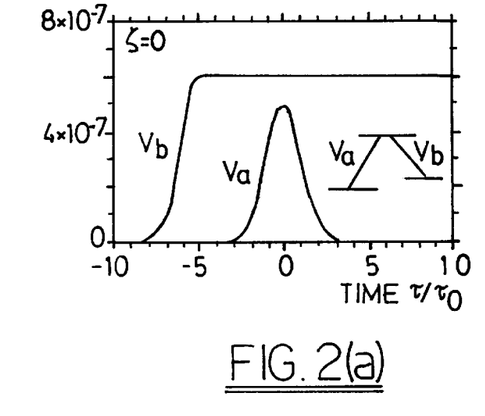
Figure 2B:
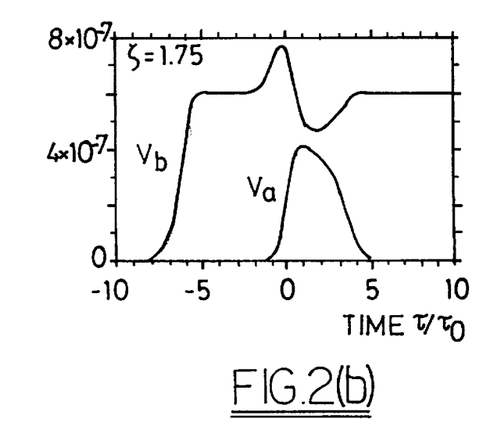
Figure 2C:
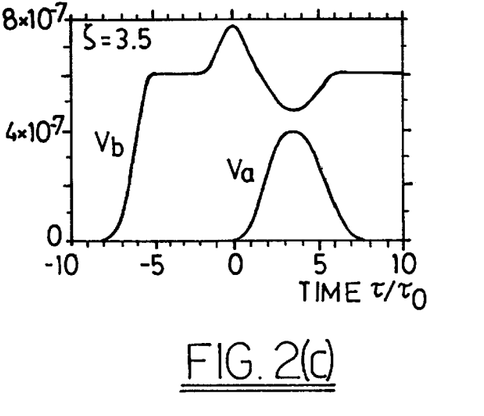
Figure 2D:
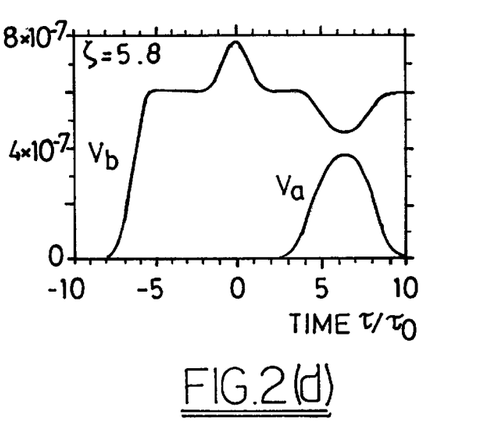

Referring to FIG. 2(a), the temporal profile of the two injected pulses is shown at the entry surface of the medium at $\zeta=0$: a Gaussian-shaped pulse $V_a(0,\tau)=A\exp[-(\tau/\tau_0)^2]$ and the second pulse with a smooth turn-on and then a constant amplitude $V_b(0,\tau)=B$ (for simplicity). In FIGS. 2(b)–2(d), temporal snapshots of both pulses after various propagation distances $\zeta$ are illustrated. These solutions were obtained by integrating the five coupled nonlinear partial differential Equations (1) and (2) on a space-time grid. An iterative predictor-corrector scheme is used to control the convergence in each space-time propagation step.

Specifically, FIGS. 2(a–d) show the evolution of a pulse pair as exact solutions of the nonlinear wave Equations (1) and (2) in a medium of three-level atoms in $\Lambda$ configuration. Temporal profiles of the pulse pairs were taken after various propagation distances $\zeta$ (measured in units of $Z_a$). After $\zeta \approx 3.5$, the pulse reshaping is completed and adiabatons have formed. The bump of $V_b$ at $\tau=0$ in FIGS. 2(b)–(d) travels with the vacuum speed of light c, whereas the adiabaton pair has a reduced speed u=c/260. Superimposed on each curve is the analytical solution of Equation (5a) and (5b), which are described later. The parameter choice was made with the optical two-color experiment in mind [$\tau_0=5\times10^7$ a.u. (atomic units), $\gamma=10^{-7}$ a.u., A=$5\times10^{-7}$ a.u., B=$6\times10^{-7}$ a.u. and $\mu=6.8\times10^{-13}$ a.u. (corresponding to an atomic density= $1.482\times10^{-10}$ a.u. and equal oscillator strength=0.1 a.u. for both transitions)].

The two pulses initially undergo significant reshaping to form the adiabaton pair. The field $V_a$ broadens and its amplitude decreases. At the same time $V_b$ develops a dip and a bump (FIG. 2(b)). When the pulses have propagated further ($\zeta \geq 3.5 Z_a$) a stable adiabaton pair has been formed (FIGS. 2(c) and 2(d)). The adiabaton pair (consisting of the dip in Vb and the broadened pulse Va) travels loss-free distances, which exceed $Z_a$ by orders of magnitude without further change of its shape at a reduced speed.

FIGS. 2(b)–2(d) establish that a proper theory of adiabatons (i.e., adiabaton pairs) can be given because these same figures also illustrate the below derived analytic solutions. The theory for predicting the nature of this nonlinear shape-preserving two-pulse excitation, i.e., adiabaton pair in system 8, and for describing the physics of the transients before the fixed pulse shapes will now be presented.

Two conditions are necessary for operation of system 8: First, the fields can be nearly arbitrary as long as they permit the following two-pulse adiabaticity relation to be satisfied:

$$\left|V_b\frac{\partial V_a}{\partial \tau} - \frac{\partial V_b}{\partial \tau}V_a\right| \ll V^3, \quad (3)$$

where $V^2$ is the total pulse energy density, $V^2=V_a^2+V_b^2$. Note that it is easy to satisfy Relation (3) by making either or both of the pulse amplitudes large. This condition indicates that the strength of the pulses governs how rapidly they can be turned on and off, and shows how the two pulses protect each other to avoid absorption by medium 22. Second, the input pulses of beams 15 and 17 should be injected in counter-intuitive order, which means that the pulse interacting with initially empty atomic states should be turned on first. In the preferred embodiment, this mandates that pulse $V_b$, the guardian beam 15, acting on the initially "empty" variables g and h with initial values to zero is turned on before pulse $V_a$, the signal beam 17, e.g., as shown in FIG. 2(a). Due to this optimal timing of guardian beam 15 with signal beam 17, their pulse envelops adjust within transmissive medium 22 to protect each other from undesirable loss, hence preserving the message signals as beams 15 and 17 travel through transmission medium 22 to receiver 24. Under these two conditions, the response of medium 22 can be very well approximated by the solutions:

$$f \approx V_b/V \qquad (4)$$

$$g \approx -\frac{i}{V_a}\frac{\partial}{\partial \tau}\frac{V_b}{V} \approx \frac{i}{V_b}\frac{\partial}{\partial \tau}\frac{V_a}{V}$$

$$h \approx -V_a/.V$$

Given Solution (4), the vector $\psi(\zeta,\tau)=[f,g,h]$ is related to one of the three adiabatic eigenvectors of Equation (2). (The exact eigenstate has a zero amplitude for g.) Because of the counter-intuitive pulse turn-on it is the only eigenvector smoothly connected to initial vector $\psi(\zeta,\tau=-\infty)=[1,0,0]$. Note that the atomic Solution (4) allow for a significant dynamical rearrangement of atomic level populations.

By inserting Solution (4) into the field Equations (1a) and (1b), the following pair of coupled nonlinear wave equations for the signal 17 and guardian 15 beams may be expressed:

$$\frac{\partial}{\partial \zeta}V_a = -\frac{1}{V}\frac{\partial}{\partial \tau}\frac{V_a}{V}, \qquad (5a)$$

$$\frac{\partial}{\partial \zeta}V_b = -\frac{1}{V}\frac{\partial}{\partial \tau}\frac{V_b}{V}. \qquad (5b)$$

Note that the relaxation parameter γ plays no role in these equations. These two Equations (5a) and (5b) are nonlinearly coupled through the variable $V(\zeta,\tau)=(V_a^2+V_b^2)^{1/2}$. One can show from Equations (5a) and (5b) that V does not depend on ζ, which means that V is determined by the input fields. If τ is changed to a new variable Z(τ), where $$Z(\tau) = \int_{\infty}^{\tau} d\tau' V^2(0,\tau'),$$

the equations simplify and can be solved analytically. The exact solutions are $$V_a(\zeta,\tau)=V(0,\tau)F_a[Z(\tau)-\zeta] \qquad (6)$$

and similarly for $V_b$. The functional form of $F_a$ is given directly from the input fields via $F_a[X]=V_a[0,Z^{-1}(x)]/V[0,Z^{-1}(x)]$. Here $Z^{-1}(x)$ denotes the inverse function of Z. Note that because of the nontrivial dependence of Z on τ due to the initial pulse shapes, neither of the fields necessarily propagates with invariant shape even though their individual energies $E_a$ (signal beam 17) and $E_b$ (guardian beam 15) are conserved.

There are important special cases, such as the one adopted for the numerical example of FIGS. 2 (a–d), which allow for a propagation into shape-invariant (adiabaton) pulses. These cases occur if the input fields $V_a(0,\tau)$ and $V_b(0,\tau)$ are chosen such that V is constant after a certain time T. Then, for $\tau \geq T$ the integral Z(τ) can be solved: $Z(\tau)=B^2\tau+\alpha$, where B is the long-time amplitude of $V_b$ (as in the earlier numerical example of FIGS. 2 (a–d)) and the constant α is determined by the early pulse forms before T. The time T corresponds to a characteristic propagation distance of $$Z(T) = \int_{\infty}^{T} d\tau' V^2(0,\tau') = Z_a + \int_{\infty}^{T} d\tau' V_b^2(0,\tau')$$

after which the pulse reshaping is completed. This length is required for the initial pulse $V_a(0,\tau)$ to evolve into its shape preserving adiabaton form:

$$V_a(\zeta,\tau)=BF_a[B^2\tau+\alpha-\zeta] \text{ for } \tau \geq T. \qquad (7)$$

The adiabaton propagates with a laboratory-frame velocity u given by $1/u=1/c+\mu/B^2$, which may be much smaller than the vacuum speed of light.

In contrast to usual types of steady states which do not depend on initial conditions, adiabatons are specified by the input pulse forms. Different input pulses evolve into different adiabatons as described by Equation (7). This feature is illustrated in FIG. 3.

Figure 3A:
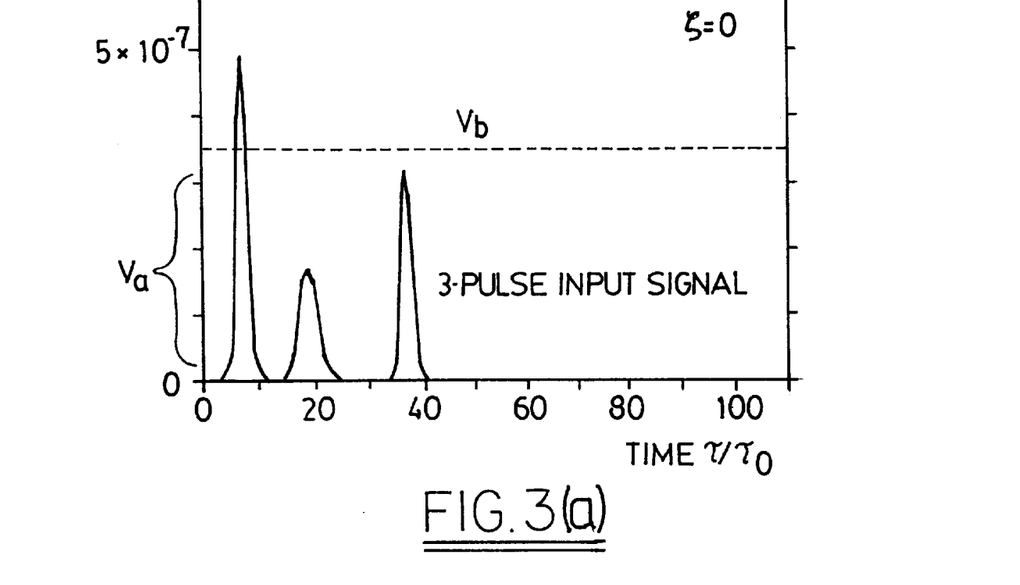
FIG. 3 illustrates an example of the propagation of optical signals in the system of FIG. 1.
Figure 3B:
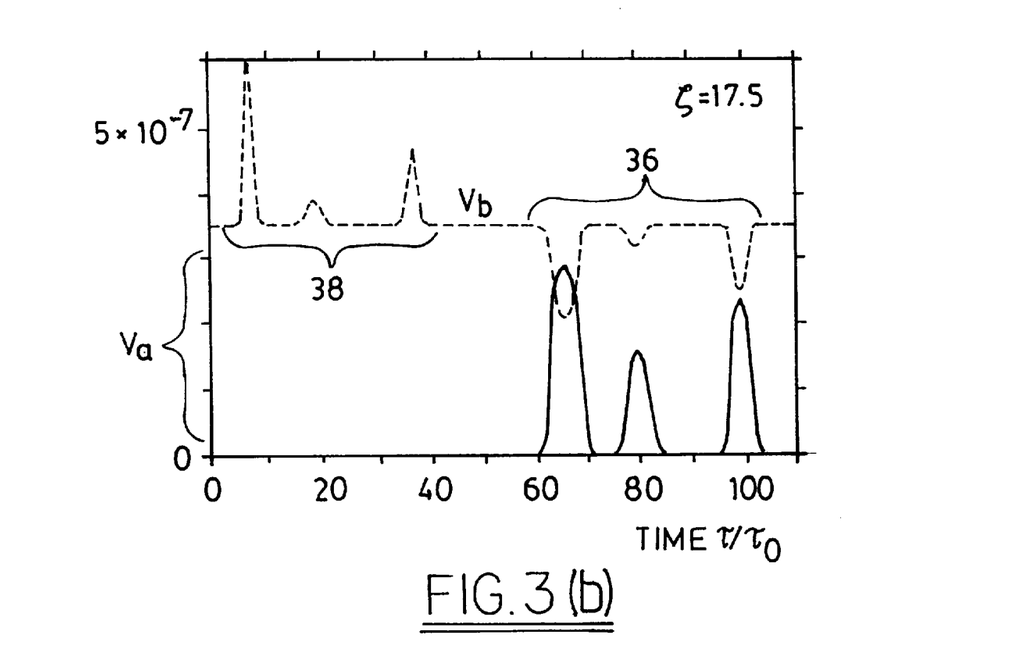

Referring to FIG. 3, the upper illustration shows an example of $V_a$ and $V_b$ before injection (at ζ=0) into medium 22, where field $V_a$ is a sequence of three distinct input signals or message pulses corresponding to the input message. The lower illustration in FIG. 3 shows the adiabatic interaction combining $V_a$ and $V_b$ at receiver 24 (at ζ=17.5). In the lower illustration, each message pulse has evolved into a corresponding loss-free propagating adiabaton pair 36. Note that these adiabaton pairs do not overlap and preserve the distinct character of the input signals. Each adiabaton pair has complementary envelopes from signal 17 and guardian 15 beams. After transmission through medium 22, the message pulses can be filtered by frequency filter 26 to retrieve the input message stored in the $V_a$ component of adiabaton pairs 36, or if desired, the message pulses can be filtered by frequency filter 26 to retrieve the input message stored in the $V_b$ component of adiabaton pairs 36.

As shown in the lower illustration of FIG. 3, the second field $V_b$ has a mimic 38 of the message pulses, which is also produced by the adiabatic interaction of $V_a$ and $V_b$. Mimic 38 is a useful redundancy of the message pulses for applications in optical transmission. For example, this redundancy of the message pulses can provide cross-modulation of guardian beam 15 with the message pulses of signal beam 17. In addition, this redundancy of the message pulses may be used for error-checking of the retrieved input message. Such error checking may be achieved by having frequency filter 26 filter the mimic 38 to retrieve a second representation of the input message, which can then be compared with a input message retrieved from signal beam 17. If this representation does not match the input message retrieved from signal beam 17, an error has occurred. Predictions arising from coupled nonlinear wave Equations (5a) and (5b), are testable in the optical domain with two-color laser experiments. For example, the reduced velocity prediction has been confirmed as reported by A. Kasapi, et al., in "Electromagnetically Induced Transparency Propagation Dynamics", Physical Review Letters, Vol. 74, Number 13, pp. 2447–2450 (1995).

Figure 4A:
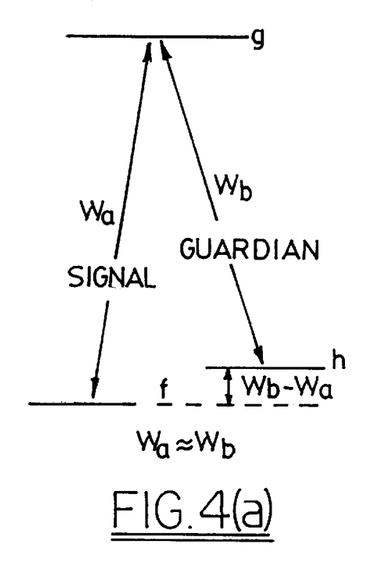
FIG. 4(a) shows an energy level model of the transmission medium where the difference between the frequencies of the signal and guardian beams travelling in the medium is small.
Figure 4B:
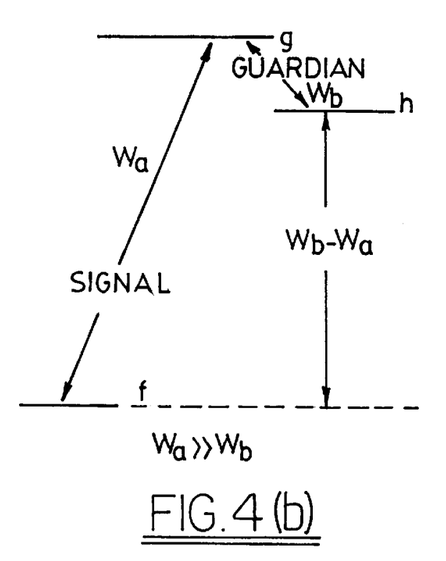
FIG. 4(b) shows an energy level model of the transmission medium where the difference between the frequencies of the signal and guardian beam travelling in the medium is large.

Referring to FIGS. 4(a) and (b), models of the energy states f, g, and h of different types of transmission medium 22 are shown. The carrier frequencies of the guardian and signal beams are represented by $w_b$ and $2_a$, respectively. In FIG. 4(a), the energy gap between states f and g (the signal beam 17) and the energy gap between states h and g (the guardian beam 15) are relatively equal. These gaps are referred to as energy transitions g-f and g-h. The energy difference between transitions g-h and g-f is directly proportional to the frequency difference between the carrier frequencies of the guardian 15 and signal 17 beams ($w_b$–$w_a$) by Planck's constant. Since the energy difference is small, so is the frequency difference.

In contrast, FIG. 4(b) shows this energy difference between transition g-h and g-f to be large, hence, the frequency difference between the carrier frequencies of the guardian 15 and signal 17 beams is large. An example of this situation is a specific atmospheric pollutant vapor, where electromagnetic field in the infrared frequencies penetrates the vapor easily, while visible light does not. Accordingly, guardian beam 15 is set to an infrared frequency and signal beam 17 is set within the visible range of light, such that their frequency difference allows the visible light on signal beam 17 to carry through the vapor.

As described above, transmission media 22 in system 8 may be characterized with the atomic level structure with energy level transitions g-f and g-h, and the energy level states f, g, and h in medium 22 are generated by beams 17 and 15 with field amplitudes $V_a$ and $V_b$, as defined by Solution (4). Equation (6) can describe signal beam 17 field $V_a$ and similarly for guardian beam 15 field $V_b$. Accordingly, once the transmission media 22 material is known, energy transitions g-f and g-h which promote adiabatic interaction of beams 17 and 15 within media 22 may be determined, which then indicates the needed frequency difference between the carrier frequencies of beams 17 and 15. Other than this frequency difference, there is no other restriction on the carrier frequencies of guardian 15 and signal 17 beams. For example, guardian 15 and signal 17 beams travelling in optically absorbing medium Pb vapor, described in article by A. Kasapi, et al. cited above, have a frequency difference of 0.321 terahertz.

To summarize, system 8 of FIG. 1 operates by satisfying the following three conditions:

(I) the two-pulse adiabaticity described in Relation (3);
(II) guardian beam 15 (field $V_b$) is turned on prior to signal beam 17 (field $V_a$); and
(III) the difference of the carrier frequencies of signal 17 and guardian 15 beams is set in accordance to the energy difference between the transitions g-f and g-h, respectively, as shown in FIGS. 4(a) and 4(b).

In reference to these three conditions (I–III), the operation of system 8 is described below. As previously described, laser 14 is fixed to generate guardian beam 15 at the first carrier frequency and laser 16 is fixed to generate beam 13 at the second carrier frequency, which is then modulated with the input message to provide signal beam 17 (with message pulses) at that second carrier frequency. Condition (III) may be satisfied by properly selecting the difference between the first and second fixed carrier frequency of beams 15 and 17 produced by lasers 14 and 16, respectively. While to meet condition (I), either or both lasers 14 and 16 may be operated to provide sufficiently large field pulse amplitudes of their respective beams. Next, to achieve condition (II), power supply 12 to lasers 14 and 16 may be controlled to time the turning on of guardian 15 and signal 17 beams such that guardian beam 15 is injected into medium 22, via coupler 20, prior to signal beam 17. A suitable mechanical means may also be used to achieve condition (II), for example, shutters in the path of the beams may be time controlled such that the guardian beam 15 shutter is opened prior to the signal beam 17 shutter.

Once beams 15 and 17 are injected into medium 22, they adiabatically interact and the message pulses in medium 22 travel nearly loss-free in shape-preserving adiabaton pairs. In this manner, the message pulses are maintained as beams 15 and 17 travel in medium 22. Note that usually only signal beam 17 is absorbed in medium 22, because there are usually no electrons in energy level h of the medium. After the adiabaton pairs of beams 15 and 17 are received by receiver 24, the message pulses in the adiabaton pairs can be filtered by filter 26 to retrieve the input message.

Note that in system 8 the shape invariant adiabaton pairs formed by beams 15 and 17 in transmission medium 22 remain subject to losses due to impurities in transmission medium 22 if the medium's oscillator strengths for both transitions differ substantially. Also, the shape invariant adiabaton pairs formed by beams 15 and 17 in transmission medium 22 are subject to dispersion in transmission medium 22. However, it is believed that the advantage of system 8 is its ability to cancel the near-resonance losses of beams 15 and 17 in absorbing medium 22 by forming adiabaton pairs, thereby facilitating beams 15 and 17 propagation through medium 22. System 8 should be useful in situations where fiber optic cable has not been laid over the desired transmission path, or environmental conditions are hostile to typical fiber optics, or the desired signal wavelength is far outside the narrow infra-red range acceptable for typical fiber optics, or the receiver is moving with respect to the transmitter (e.g., one is fixed and the other is on an airplane, satellite or ship).

Figure 5:
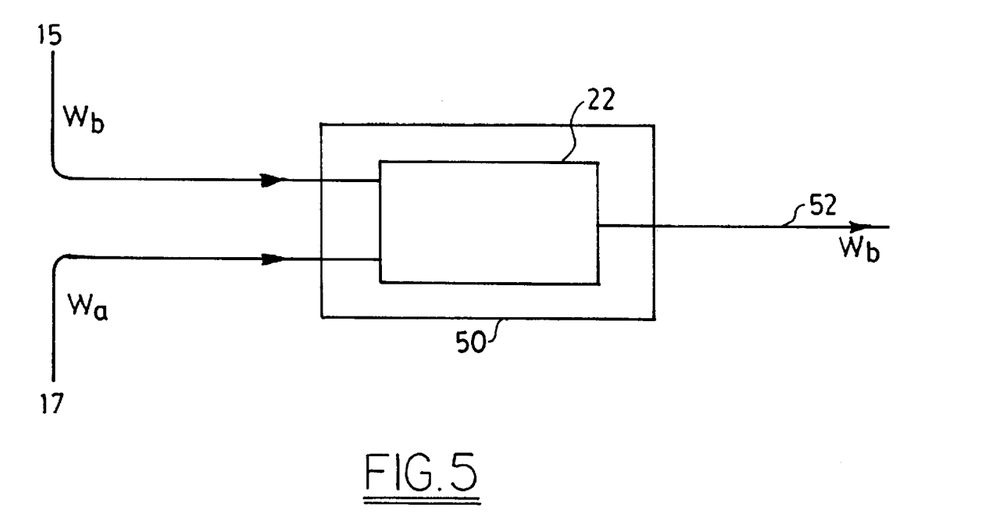
FIG. 5 illustrates a modulating transmitter (or frequency converter) in accordance with the present invention.

Referring to FIG. 5, the invention may be used to create a modulating transmitter 50, which is also referred to as a frequency converter. The optical signal (modulation) which is contained in input beam 17 of carrier frequency $w_a$ is transferred or converted to input beam 15 of carrier frequency $w_b$. An output beam 52 of carrier frequency $w_b$ contains then the signal of input beam 17. In other words, beam 52 is outputted from medium 22 having a beam 15 component modulated with the optical signal of beam 17. This modulation is enabled by the adiabatic interaction of beams 15 and 17 occurring in medium 22. The modulated optical signals in output beam 52 are represented by the mimic of the adiabaton pairs, such as shown by mimic 38 in the example of FIG. 3. Medium 22 is chosen to be any suitable material that provides an adiabatic interaction between its two input beams 15 and 17. The modulated optical signals in beam 52 may also be represented by the adiabaton pairs, such as shown by pairs 36 of FIG. 3. In modulating transmitter 50, medium 22 may be used apart from system 8. Accordingly, beams 15 or 17 (or both) can be provided by external sources, such as fiber optic lines, and thus are not limited to those provided by lasers 14 and 16, or modulator 18 (FIG. 1). Further, output beam 52 of medium 22 may be optically coupled to another transmission medium or fiber optic cable to continue transmission of beam 52.

From the foregoing description, it will be apparent that there has been provided improved system, method and apparatus for transmission of optical signals. Variations and modifications in the herein described systems, in accordance with the invention, will undoubted suggest themselves to those skilled in the art. Accordingly, the foregoing description should be taken as illustrative and not in a limiting sense.

We claim:

1. A method for transmitting optical signals through a transmission medium comprising the steps of:

generating first and second laser beams having optical signal pulses at a first and second frequency, respectively, wherein the first frequency is different from the second frequency, and wherein said second beam is modulated with signals corresponding to an input message;

selecting the difference between said first frequency and said second frequency in accordance with characteristics of said transmission medium for adiabatic interaction of the optical signal pulses in said first and second beams, wherein said adiabatic interaction maintains the signals corresponding to the input message when said first and second beams travel within said transmission medium;

injecting said first and second beams into said transmission medium; and receiving from said transmission medium said first and second beams, and said signal corresponding to the input message therein.

2. The method according to claim 1 wherein said transmission medium is absorbent to at least said second of said laser beams.

3. The method according to claim 1 wherein said first beam is injected into said transmission medium prior to said second beam.

4. The method according to claim 1 wherein said signals corresponding to an input message represent message pulses.

5. The method according to claim 4 further comprising the step of filtering said message pulses from one of said first and second beams to retrieve said input message.

6. The method according to claim 4 wherein for each said message pulse in said second beam at least one representation of said message pulse forms in said first beam while said first and second beams travel within said transmission medium, said method further comprising the steps of:

filtering said message pulses from said first beam;
filtering said message pulses from said second beam;
retrieving a first output message corresponding to said message pulses filtered from said first beam;
retrieving a second output message corresponding to said message pulses filtered from said second beam; and
comparing said first output message and said second output message to determine errors between said first and second output messages.

7. The method according to claim 4 wherein for each said message pulse in said second beam at least one representation of said message pulse forms in said first beam while said first and second beams travel within said transmission medium, thereby cross-modulating said first beam with said message pulses of said second beam.

8. The method according to claim 1 wherein said injecting step further comprises the step of:

injecting said first and second beams into said transmission medium to form adiabaton pairs, wherein said adiabaton pairs preserve the shape of the message pulses.

9. The method according to claim 1 wherein:

said first and second beams have energy fields $V_b$ and $V_a$, respectively, total pulse energy density of the beams is $V^2$ and $V^2$ equals $(V_a^2+V_b^2)$; and $V^3$ is sufficiently large for adiabatic interaction at said selected difference between said first frequency and said second frequency.

10. A system for transmitting optical signals through a transmission medium comprising:

a transmitter comprising a first laser which generates a first beam having optical signal pulses at a first frequency, a second laser which generates a second beam having optical signal pulses at a second frequency different from said first frequency, means for modulating said second beam with signals corresponding to an input message, and means for injecting said first and second beams into said transmission medium, wherein the difference between said first frequency and said second frequency provides for adiabatic interaction within said transmission medium of the optical signal pulses in said first and second beams, and said adiabatic interaction maintains said signals corresponding to said input message when said first and second beams travel within said transmission medium; and a receiver for receiving from said transmission medium said first and second beams, and said signals corresponding to said input message therein.

11. The system according to claim 10 wherein said transmission medium is absorbent to at least said second of said laser beams.

12. The system according to claim 10 wherein said first beam is injected into said transmission medium prior to said second beam.

13. The system according to claim 10 wherein said signals corresponding to an input message represent message pulses.

14. The system according to claim 13 wherein said receiver further filters said message pulses from one of said first and second beams to retrieve said input message.

15. The system according to claim 13 wherein for each said message pulse in said second beam at least one representation of said message pulse forms in said first beam while said first and second beams travel within said transmission medium, said system further comprising:

means for filtering said message pulses from said first beam;
means for filtering said message pulses from said second beam;
means for retrieving a first output message corresponding to said message pulses filtered from said first beam;
means for retrieving a second output message corresponding to said message pulses filtered from said second beam; and
means for comparing said first output message and said second output message to determine errors between said first and second output messages.

16. The system according to claim 13 wherein for each said message pulse in said second beam at least one representation of said message pulse forms in said first beam while said first and second beams travel within said transmission medium, thereby cross-modulating said first beam with said message pulses of said second beam.

17. The system according to claim 10 wherein said injecting means further comprises:

means for injecting said first and second beams into said transmission medium to form adiabaton pairs, wherein said adiabaton pairs preserve the shape of the message pulses.

18. The system according to claim 10 wherein:

said first and second beams have energy fields $V_b$ and $V_a$, respectively, total pulse energy density of the beams is $V^2$ and $V^2$ equals $(V_a^{\,2}+V_b^{\,2})$; and $V^3$ is sufficiently large for adiabatic interaction at said selected difference between said first frequency and said second frequency.

19. A transmitter for sending optical signals through a transmission medium comprising:

a first laser which generates a first beam having optical signal pulses at a first frequency;

a second laser which generates a second beam having optical signal pulses at a second frequency sufficiently different from said first frequency to generate an adiabaton pair when the two beams are combined;

at least one of said first and said second laser beams has a sufficiently large pulse amplitude;

means for modulating said second beam with message pulses corresponding to an input message; and means for injecting said first and second beams into said transmission medium and forming an adiabaton pair, wherein said first beam is injected into said transmission medium prior to said second beam.

20. A receiver for receiving from a transmission medium an adiabaton pair within two beams of optical pulses, each said beam operating at a different optical pulse frequency, where said adiabaton pair maintains a message pulse corresponding to an input message, said receiver comprising:

means for receiving said two beams, and said adiabaton pair therein; and means for filtering said message pulse from said adiabaton pair to retrieve said input message.

21. The receiver according to claim 20 wherein said message pulse is represented in both beams, and wherein said filtering means further comprises means for filtering said message pulse from said adiabaton pair from each said beam to retrieve a representation of said input message from each beam, said receiver further comprising means for comparing the representation of the input message of each beam to determine errors between the representations.

22. A method for optical signal transmission through a transmission medium having two ends comprising the steps of:

generating a first laser beam having optical signal pulses at a first frequency;

generating a second laser beam having optical signal pulses at a second frequency;

pulse modulating the second beam responsive to data representing an input message to provide message pulses corresponding to said data in said second beam;

selecting the difference between said first and said second frequencies responsive to the atomic structure of said transmission medium to provide an adiabaton pair for each message pulse when said first and second pulses travel within said transmission means, said adiabaton pair being defined by a decrease in the energy field of the first beam and a broadening of the energy field of said second beam at the point in said second beam of each message pulse;

generating at least one of said first and second beams with a sufficiently large pulse amplitude to provide said adiabaton pair for each message pulse at said selected difference between said first and said second frequencies;

injecting said first and second beams into one end of said transmission medium, wherein the first beam is injected into said transmission medium prior to said second beam, and said adiabaton pairs within said first and second beams travel to the other end of said transmission medium;

receiving said first, second beams, and said adiabaton pairs within said first and second beams; and frequency filtering said first and second beams to separate said message pulses from said adiabaton pairs within said first and second beams to retrieve said data corresponding to the input message.

23. A method for preserving in a medium the shape of optical pulses modulating a signal beam operating at a first frequency, comprising the steps of:

providing a guardian beam operating at a second frequency sufficiently different from said first frequency to generate adiabaton pairs when the two beams jointly propagate within the medium;

providing at least one of said signal beam and said guardian beam with a sufficiently large pulse amplitude to generate adiabaton pairs when the two beams jointly propagate within the medium; and injecting the guardian and signal beams into the medium and forming said adiabaton pairs, wherein the guardian beam is injected prior to the signal beam.

* * * * *

UNITED STATES PATENT AND TRADEMARK OFFICE
CERTIFICATE OF CORRECTION

PATENT NO. : 5,920,415
DATED : July 6, 1999
INVENTOR(S) : Rainer Grobe

Page 1 of 1

It is certified that error appears in the above-identified patent and that said Letters Patent is hereby corrected as shown below:

Column 1,
Line 6, should be inserted -- This invention was developed with Government funding from the National Science Foundation under grant PHY91-11562. The U.S. Government may have certain rights in this invention. --

Signed and Sealed this

Twenty-second Day of June, 2004

JON W. DUDAS
*Acting Director of the United States Patent and Trademark Office*